Figure 1:
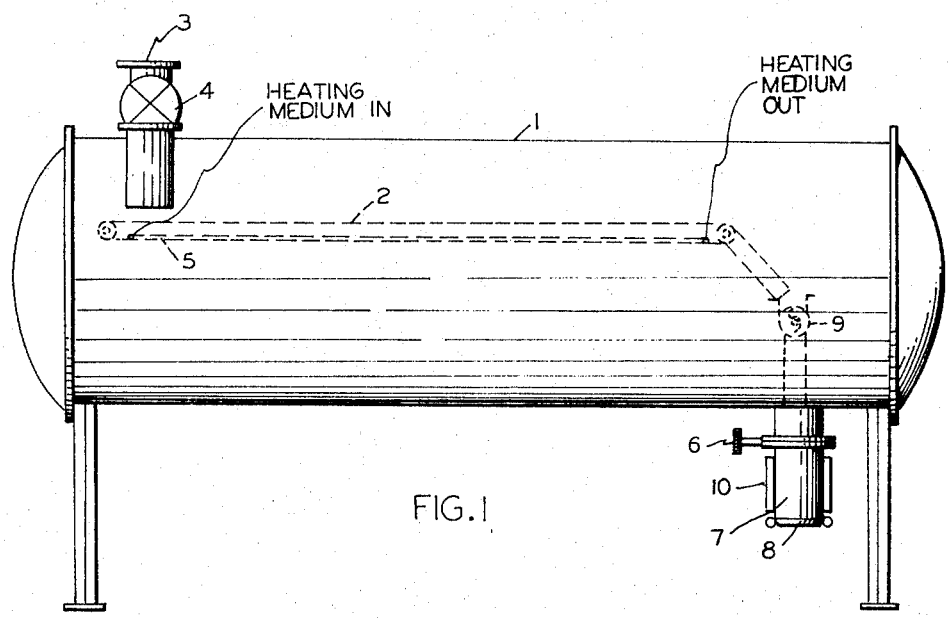

July 16, 1968

J. CORDING, JR 3,392,660

FOOD PROCESSING APPARATUS

Filed June 3, 1963

INVENTOR
JAMES CORDING, JR.

BY R. Hoffman & W. Bier

ATTORNEYS

United States Patent Office 3,392,660
Patented July 16, 1968

3,392,660
FOOD PROCESSING APPARATUS
James Cording, Jr., Philadelphia, Pa., assignor to the United States of America as represented by the Secretary of Agriculture
Filed June 3, 1963, Ser. No. 285,156
2 Claims. (Cl. 99—238)

A non-exclusive, irrevocable, royalty-free license in the invention herein described, throughout the world for all purposes of the United States Government, with the power to grant sublicenses for such purposes, is hereby granted to the Government of the United States of America.

This invention relates to apparatus for preparing rapidly rehydratable dehydrated fruit and vegetable pieces.

In the process for making quick-cooking dehydrated vegetable and fruit pieces, as disclosed in U.S. Patent No. 3,038,813, the partially dehydrated pieces are placed in a closed chamber, heated by an external flame played on the outer surface of the rotary chamber until their contained water is superheated with respect to its atmospheric boiling point, and then the chamber is opened suddenly. This procedure imparts a porous structure to the pieces, permitting rapid final drying, and imparting rapid rehydration qualities to the finally dried pieces.

Cereal puffing guns have been used for the heating and exploding process. These machines, while they serve the purpose, suffer certain disadvantages. They are batch-operated which is costly and time consuming. Their capacity depends upon their inner surface, i.e., the amount of charge they can handle is related to their inner surface area and not to their volumetric capacity. Therefore, they must of necessity become very large if a large heating area is to be obtained so that a large charge may be handled. To increase the heating area, either the diameter or the length of the gun, or both must be increased. Because of the difficulty in maintaining a tight seal between the lid and the barrel of the gun, and because of the large total force exerted on a lid of large diameter, there is a practical limit on diameter; this appears to be about 10 inches. It is obvious that a practical limit on length exists also, because of the fact that the barrel has to be swung from the horizontal (heating position) toward the vertical with the muzzle down (for discharging) and then toward the vertical with the muzzle up (for loading). Furthermore, it is difficult if not impossible to discharge all of the contents quickly from a long barrel.

Figure 2:
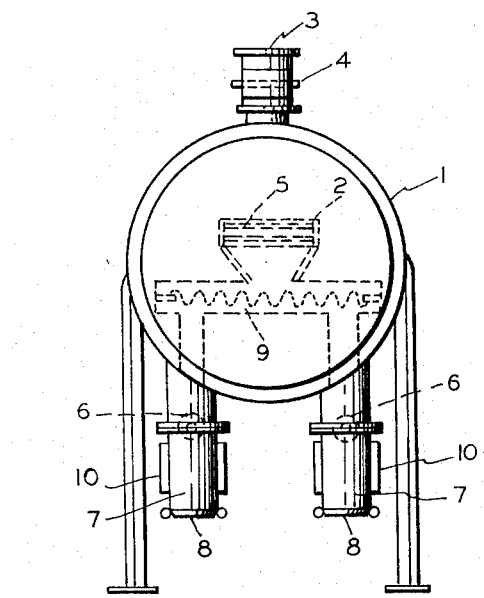

An object of the present invention is to provide a means of increasing production from puffing guns of relatively small diameter. Another object is to separate the functions of heating and of explosive puffing, thereby eliminating the need for puffing guns of large volume. A further object is to provide a substantially continuous process for preparation of partially dehydrated food pieces of porous structure. Other objects and a fuller understanding of the invention may be had by referring to the following description and claims, taken in conjunction with the accompanying drawing in which:

FIGURE 1 is a diagrammatic illustration of a side view of an apparatus for practicing the invention, and FIGURE 2 is an end view of the same apparatus.

In general according to the present invention the apparatus comprises a first pressure chamber, a first opening to the chamber provided with pressure controlling means for introducing pieces of food through this opening, a second opening in the first chamber for removal of pieces of food, means for transporting the food pieces between the first and second openings, means intermediate the first and second openings for heating the pieces of food, a second pressure chamber extending in a generally downward direction from the first chamber and connected to the first chamber so that the second opening is common to both chambers, a substantially gas-tight first closure between the first and second chambers, a discharge opening located generally terminally in the second chamber with a quick-opening, substantially gas-tight second closure for this opening, means for opening and closing the two closures and controlled so that one is always closed before the other is opened, and means for adjusting pressure in the first chamber.

In this apparatus the piece of food are superheated in a relatively large chamber, then transferred to a small chamber (or plurality of small chambers) for the explosive discharge to atmospheric pressure. Since the latter will be used only for this purpose, the exploding chamber can be small, can be filled completely before discharge, has no need to be rotatable, can be fixed permanently with the discharge in a generally downward direction, and can be of small diameter, simplifying construction of a tight closure.

The apparatus is further described with reference to the drawing. The shape of the pressure chamber 1 is optional, although a cylindrical shape provides strength and is practical for housing elongated equipment such as the conveyor belt 2. The partially dehydrated food pieces are introduced by gravity through the opening 3 by means of an air-lock mechanism 4, onto the conveyor means 2, such as a stainless steel belt or platen, and heated, as by steam or radiant heat 5. The particular means of heating and conveying the food pieces is immaterial to the invention. A vibratory conveyor, endless belt, or other means may be employed. The pieces go from the conveyor through closure 6 into the small chamber or "gun" 7. Then closure 6 is secured and closure 8 is opened instantly.

In operation, with closure 6 open, the interior of the large 1 and small 7 chambers is brought to the desired pressure with air, $CO_2$, $N_2$ or mixture of gases, preferably low in oxygen, and the heating is conducted under pressure of the introduced gas or of water vapor generated by heating the pieces of food. Partially dehydrated food pieces are introduced into the chamber 1 at the feed end at a measured and controlled rate to the conveyor 2. The rate of movement along the conveyor, temperature and pressure are controlled to obtain the desired conditions in the food pieces by the time they enter the small chamber. The pieces are directed to different guns by baffles, conveyors 9, or other means. When a gun is full, or nearly full, it is isolated from the large chamber by operating closure 6 and the other closure 8 is opened instantly to the atmosphere. Closure 6 does not have to open rapidly and may be one of several types which when open will allow the food pieces to pass readily into the small chamber and which seats well when closed. Closure 8 must be of a "quick-opening" type. Maintenance of pressure in 1 requires that one closure be shut before the other is opened.

The discharged pieces take on a porous structure by virtue of the flashing to steam of part of their contained water. They are then dried by any convenient means to stable moisture content. Alternately filling and discharging the guns provides a continuous stream of product to the final drying operation. Condensation of steam within the small chamber or gun 7 is prevented by providing a heating means 10 such as a steam jacket or electric heater, although this is not a required feature, especially if the chamber is insulated.

While discharging a small chamber will dissipate pressure from chamber 1, the means of adjusting pressure in 1 should allow for release of excess pressure if this occurs.

I claim:
1. An apparatus providing contiguous functions for the heating and explosive puffing of food pieces comprising a first pressure chamber, a first opening in said first chamber, means for introduction of pieces of food into said first chamber through said first opening, a second opening in said first chamber for removal of pieces of food, means for transporting the food pieces between the first and second openings, means intermediate the first and second openings for heating the food pieces, a second pressure chamber extending in a generally downward direction from said first chamber and connected to said first chamber such that said second opening is common to both chambers, a substantially gas-tight first closure for said second opening, a discharge opening located generally terminally in said second chamber, a substantially gas-tight, quick-opening second closure for said discharge opening, means for opening and closing said closures, and means for adjusting pressure in said first chamber.

2. An apparatus as in claim 1 which includes means of externally heating said second chamber.

References Cited

UNITED STATES PATENTS

| 3,202,084 | 8/1965 | Hale | 99—238 |
| 2,809,576 | 10/1957 | Von Edeskuty | 99—238 |
| 2,863,375 | 12/1958 | Long et al. | 99—238 |
| 3,038,813 | 6/1962 | Cording | 99—207 |
| 3,057,739 | 10/1962 | Forkner | 99—204 |
| 3,060,037 | 10/1962 | Dorsey et al. | 99—204 |
| 2,026,734 | 1/1936 | Ferguson | 99—238 |

ROBERT W. JENKINS, *Primary Examiner.*

LAWRENCE CHARLES, *Examiner.*

W. VAN SANTEN, *Assistant Examiner.*